United States Patent [19]

Iwai et al.

[11] Patent Number: 4,541,502

[45] Date of Patent: Sep. 17, 1985

[54] REAR AXLE SUPPORTING STRUCTURE IN THREE-WHEELED MOTOR VEHICLE

[75] Inventors: Kazuhiro Iwai; Tatsuo Masuda; Shinji Takayanagi, all of Saitama, Japan

[73] Assignee: Honda Giken Kogyo Kabushiki Kaisha, Tokyo, Japan

[21] Appl. No.: 498,253

[22] Filed: May 26, 1983

[30] Foreign Application Priority Data

May 31, 1982 [JP] Japan .............................. 57-80284[U]
Jun. 3, 1982 [JP] Japan .............................. 57-82525[U]

[51] Int. Cl.⁴ ............................................ B62D 61/08
[52] U.S. Cl. ................................. 180/217; 188/18 A; 188/344; 474/112; 474/116
[58] Field of Search ............. 180/215, 217; 188/18 A, 188/344; 474/112, 116

[56] References Cited

U.S. PATENT DOCUMENTS

| | | | |
|---|---|---|---|
| 519,252 | 5/1894 | Ford | 474/112 |
| 604,294 | 5/1898 | Bernson | 474/112 |
| 3,713,502 | 1/1973 | Delaney et al. | 180/217 |
| 3,733,919 | 5/1973 | Rupp, II | 474/112 |
| 3,935,927 | 2/1976 | Haraikawa | 188/344 |
| 4,068,743 | 1/1978 | Karasudani et al. | 188/18 A |
| 4,237,744 | 12/1980 | Jolly | 474/112 |
| 4,343,380 | 8/1982 | Kawaguchi | 188/344 |

FOREIGN PATENT DOCUMENTS 226265 7/1909 Fed. Rep. of Germany ...... 180/217

Primary Examiner—Joseph F. Peters, Jr.
Assistant Examiner—Kenneth R. Rice
Attorney, Agent, or Firm—Irving M. Weiner; Joseph P. Carrier; John J. Cantarella

[57] ABSTRACT

A rear axle supporting structure in a three-wheeled motor vehicle equipped with a chain drive mechanism. A holder member having an eccentric bore is fitted in a pipe member which is fixed to the rear end of a swing arm, and a rear axle is inserted in the eccentric bore of the holder member. A brake caliper for braking a brake disc is connected to the holder member through a caliper supporting member concentrically rotatably with respect to the eccentric bore of the holder member.

Adjustment of the drive chain is effected by turning the holder member, without affecting the positional relation between the vehicle body frame and the swing arm, without any inclination of the rear axle occurring, and while maintaining a constant positional relation between the brake disc and the brake caliper.

7 Claims, 7 Drawing Figures

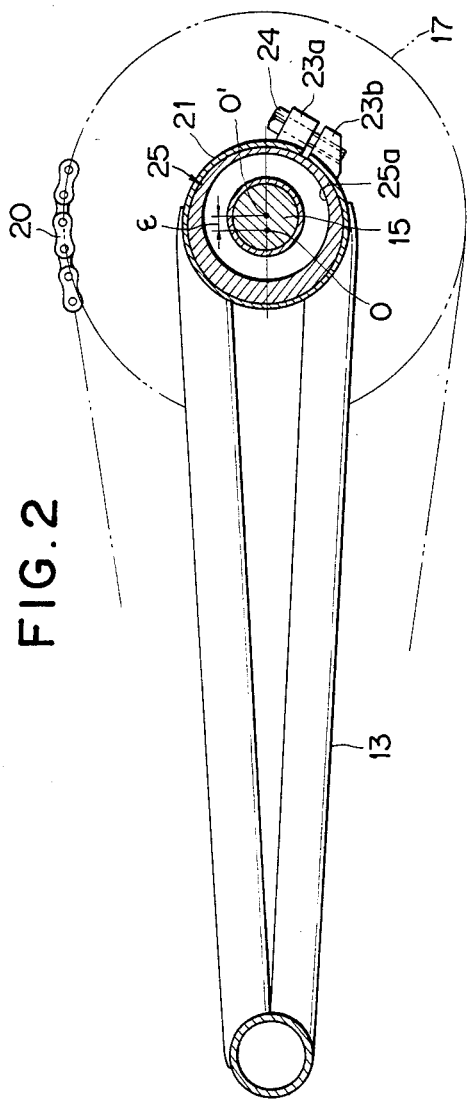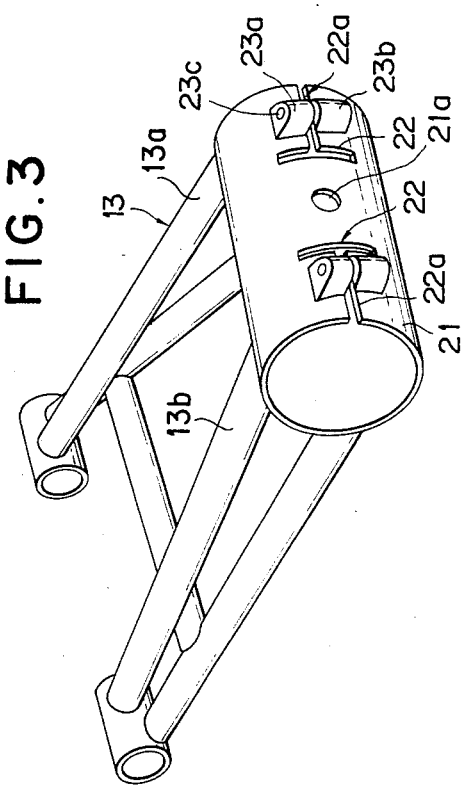

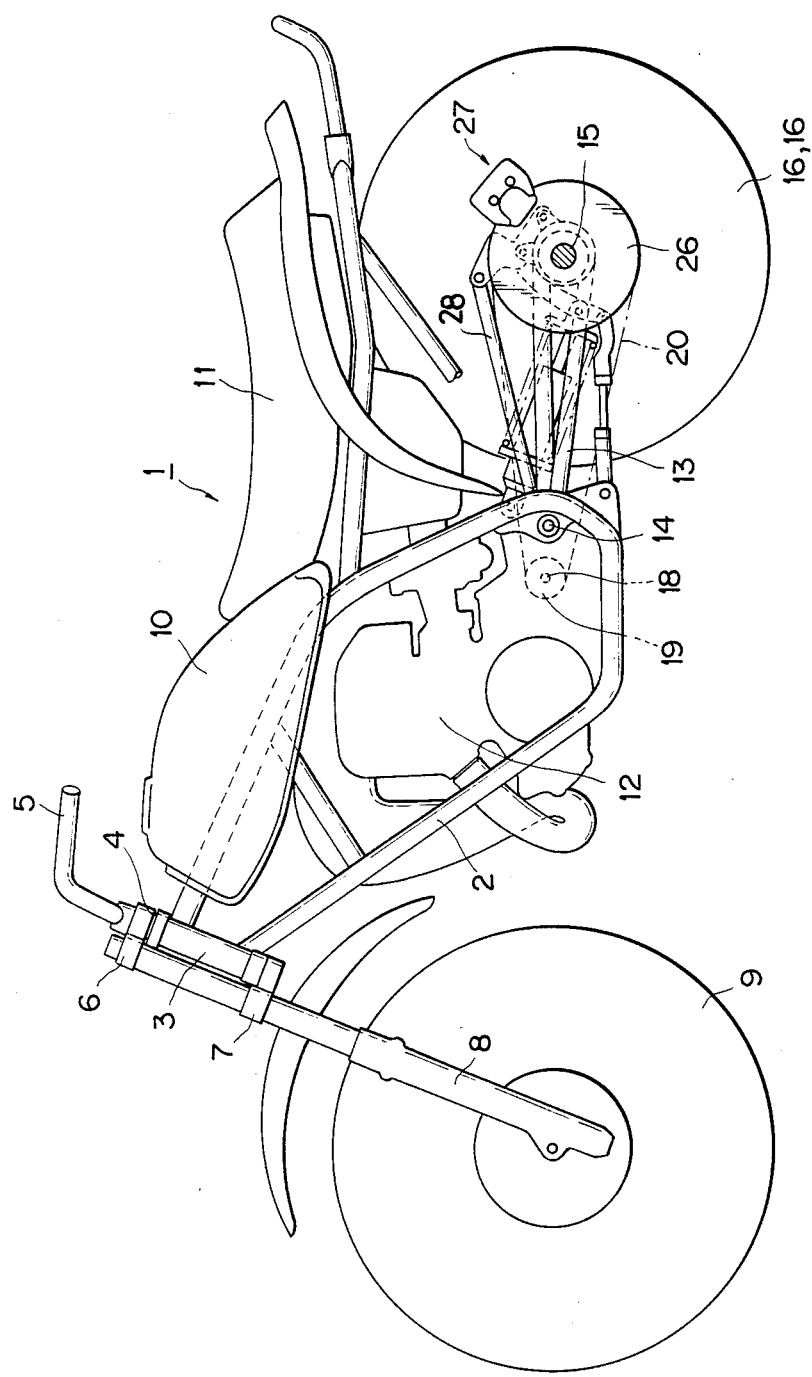

REAR AXLE SUPPORTING STRUCTURE IN THREE-WHEELED MOTOR VEHICLE

BACKGROUND OF THE INVENTION

1. Field of the Invention

The present invention relates generally to a rear axle supporting structure in a three-wheeled motor vehicle. More particularly, the invention relates to a rear axle supporting structure in a three-wheeled vehicle equipped with a chain drive mechanism.

2. Description of Relevant Art

In three-wheeled motor vehicles of the type in which two rear wheels are driven by a drive chain, especially in those of the type in which two rear wheels are rotatably supported at the rear end of a swing arm, the front end of which is vertically pivotably attached to the vehicle body frame, adjustment of the drive chain has been performed by moving the pivot center of the swing arm in the longitudinal direction relative to the vehicle body frame.

Such chain adjusting method is advantageous in that the structure of the support portion for the rear axle at the rear end of the swing arm is simplified and the unsprung weight is decreased. However, because the pivot centers at the fore ends of the right and left arm portions of the swing arm are adjusted separately, the adjusting operation is troublesome, and it has been difficult to select a proper positional mounting relation between the vehicle body frame and the right and left arm portions of the swing arm.

The present invention effectively overcomes such problems attendant the adjustment of a rear wheel driving chain in conventional three-wheeled motor vehicles equipped with a chain drive mechanism.

SUMMARY OF THE INVENTION

The present invention provides a rear axle supporting structure in a three-wheeled motor vehicle having a drive chain for driving two rear wheels rotatably supported at the rear end of a swing arm, the front end of which is vertically pivotably attached to a body frame of the motor vehicle. The supporting structure comprises a pipe member fixed to the rear end of the swing arm, a bearing holder member rotatably fitted in the pipe member and having an eccentric bore with an axis which is eccentric relative to the axis of the pipe member, a rear axle for the two rear wheels which is rotatably fitted in the eccentric bore so as to be concentric therewith, and a driven sprocket fixed on the rear axle and adapted to be driven by the drive chain.

A brake disc is fixed on the rear axle and a brake caliper for braking the brake disc is supported by the bearing holder member concentrically pivotably with the eccentric bore of the bearing holder member.

It is an object of the present invention to provide a rear axle supporting structure in a three-wheeled motor vehicle which permits easy and efficient adjustment of the drive chain without affecting the positional relation between the vehicle body frame and the swing arm and without any fear of inclination of the rear axle.

Another object of the present invention is to provide a rear axle supporting structure in a three-wheeled motor vehicle capable of maintaining a constant positional relation between the brake caliper and the brake disc in the adjustment of the drive chain.

It is a further object of the present invention to provide a rear axle supporting structure in a three-wheeled motor vehicle which permits easy replacement of the brake caliper and thus facilitates maintenance.

The above and further objects, details and advantages of the present invention will become apparent from the following detailed description, when read in conjunction with the accompanying drawings.

BRIEF DESCRIPTION OF THE DRAWINGS

FIG. 2 is a longitudinal sectional side view of a swing arm portion and the vicinity of a rear axle in the three-wheeled motor vehicle shown in FIG. 1.

FIG. 3 is a perspective view of a swing arm.

FIG. 4 is a side view of a three-wheeled motor vehicle equipped with an entire rear axle supporting structure according to the present invention.

DETAILED DESCRIPTION OF PREFERRED EMBODIMENT

Figure 1:
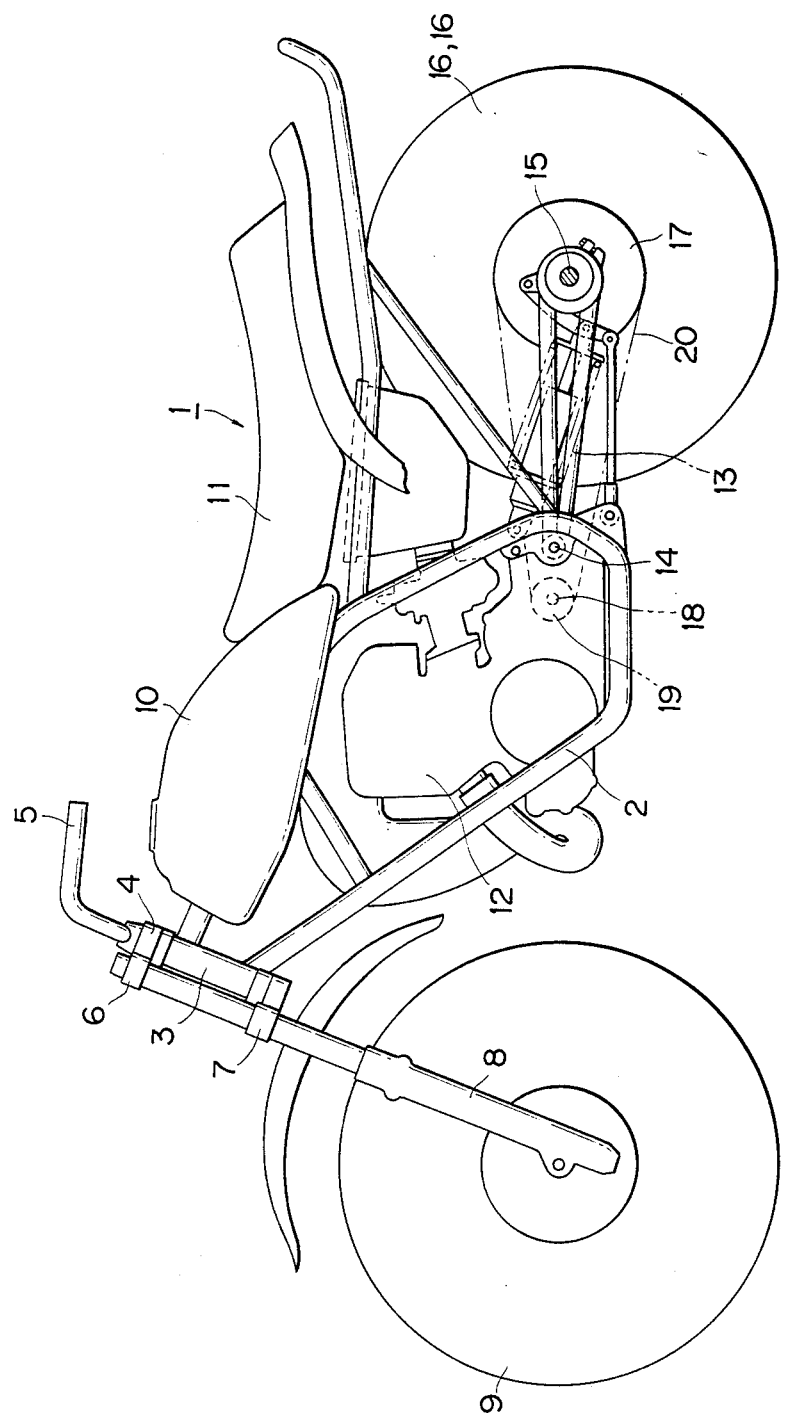
FIG. 1 is a side view of a three-wheeled motor vehicle equipped with a rear axle supporting structure according to the present invention, with a brake disc and a brake caliper being omitted.

Referring first to FIG. 1, there is shown a three-wheeled motor vehicle 1, in which a head pipe 3 is fixed to the fore end of a vehicle body frame 2, a steering shaft 4 is rotatably fitted in the head pipe 3, and a handlebar 5 is fixed to the upper end of the steering shaft 4. Further, top and bottom bridges 6 and 7 are integrally fixed to the steering shaft 4, and the upper portion of a front fork 8 is inserted and fixed through the bridges 6 and 7, with a single front steering wheel 9 being rotatably supported by the lower portion of the front fork 8.

Behind the head pipe 3 is disposed a fuel tank 10, and behind the fuel tank 10 is disposed a seat 11, while an engine 12 is mounted on the body frame 2 below the fuel tank 10.

Attached to a lower, substantially central part of the vehicle body is the fore end of a swing arm 13, which is vertically pivotably supported by a pivot shaft 14, while a rear axle 15 extends rotatably through the rear end of the swing arm 13, and to the respective ends of the rear axle 15 are fixed two rear driving wheels 16. The rear wheels 16 each comprise an ultra-low pressure tire of large diameter and large width, commonly referred to as a "balloon tire".

A driven sprocket 17 is fixedly mounted on the rear axle 15, and a driving chain 20 is operatively connected between the driven sprocket 17 and a driving sprocket 19 of a smaller diameter which is mounted on an end portion of an output shaft 18 of the engine 12.

Referring now to FIGS. 2 and 3, a bearing holder pipe 21 is fixed to the rear ends of right and left side members 13a, 13b of the swing arm 13 so as to interconnect the rear ends of the swing arm side members 13a, 13b, as shown in FIG. 3. As also shown in FIG. 3, recumbent T-shaped slits are formed on the pipe 21 extending from both edges thereof. Bolt tightening brackets 23a and 23b are provided projectingly on the outer periphery of the pipe 21 in positions above and below a horizontal portion 22a of each of the slits 22. The brackets 23a and 23b are formed with through holes 23c, into which are threadedly inserted clamping bolts 24 as shown in FIG. 2.

As shown in FIG. 2, inserted in the bearing holder pipe 21 is a bearing holder member 25 having an eccentric bore 25a which is eccentric by an amount ϵ from the center 0 of the pipe 21. The holder 25 is held firmly within the pipe 21 by tightening the clamping bolts 24.

Further, in the rear end of the pipe 21 is formed a hole 21a for threaded insertion therein of an auxiliary fixing bolt for the bearing holder 25.

Referring now to FIG. 4, there is shown the three-wheeled motor vehicle of FIG. 1 as further provided with a braking mechanism for the rear wheels. A brake disc 26 is fixed on the rear axle 15, and a brake caliper 27 for braking the brake disc 26 is fixed in a predetermined position by means of a stay and a bracket as will be described hereinbelow. The rear axle 15 shown in FIG. 4 is in a foremost position within the pipe 21.

Figure 5:
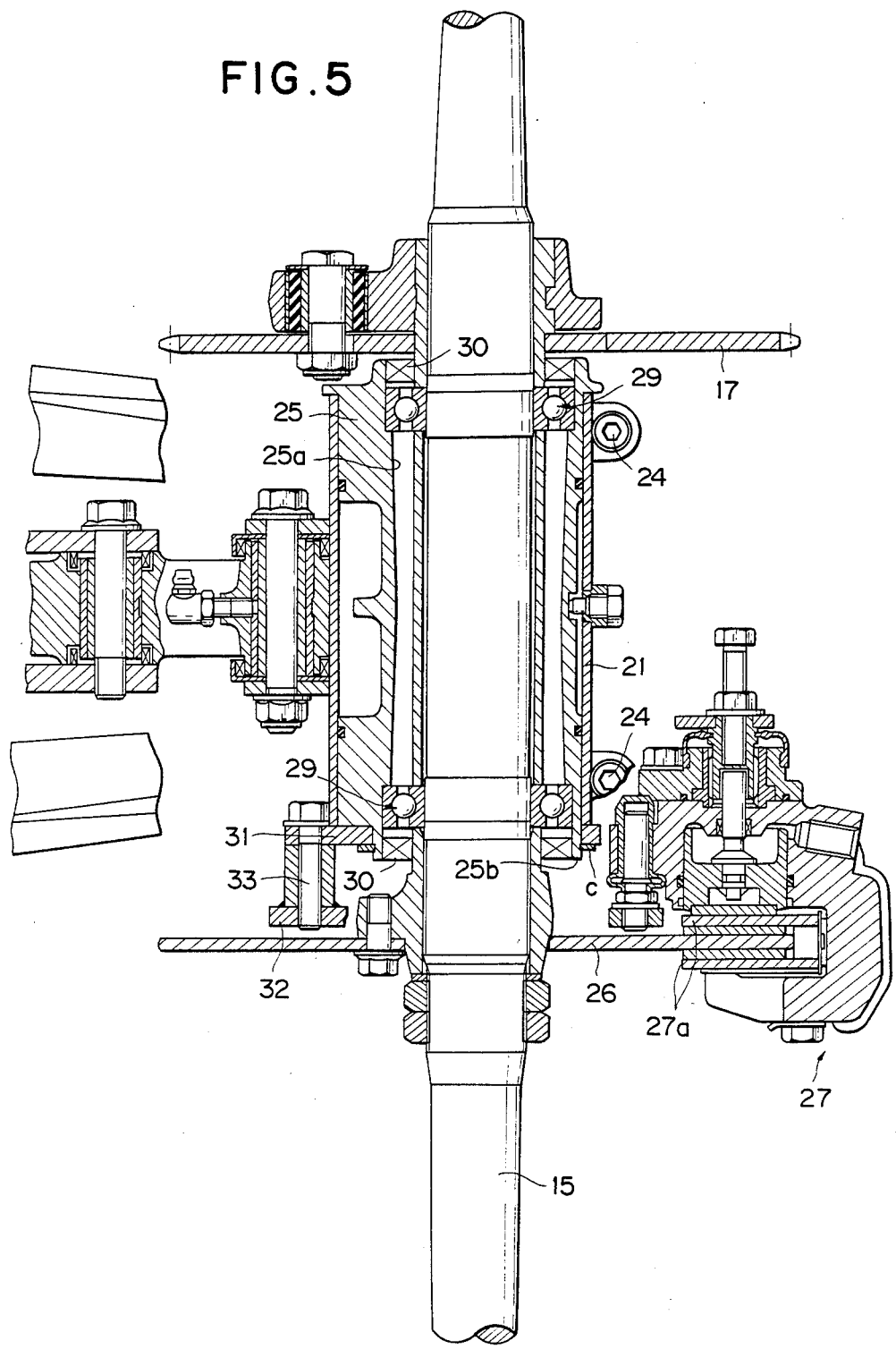
FIG. 5 is a sectional view of the rear axle and its vicinity in the three-wheeled motor vehicle shown in FIG. 4.
Figure 6:
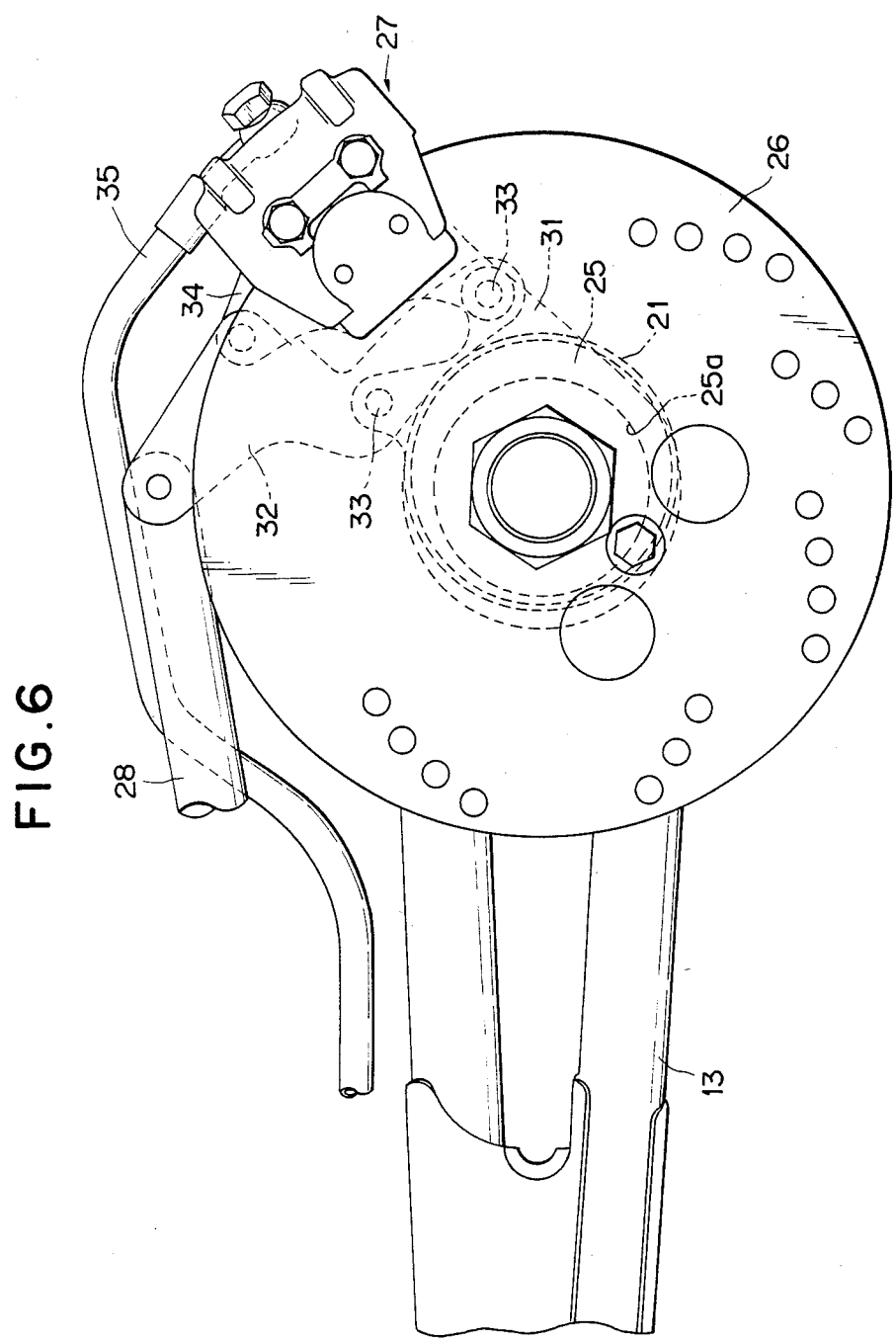
FIG. 6 is a side view of a brake system disposed in the vicinity of the rear axle of the three-wheeled motor vehicle shown in FIG. 4.

Referring now to FIGS. 5 and 6, the rear axle 15 is inserted into the eccentric bore 25a of the bearing holder 25, and is rotatably supported by the bearing holder 25 through spaced apart bearings 29. Reference numeral 30 in FIG. 5 denotes an oil seal.

To one portion of the rear axle 15 extending outside of the bearing holder 25 is integrally fixed the driven sprocket 17, and to the other such portion is fixed the brake disc 26.

At the end portion of the bearing holder 25 on the brake disc 26 side, a cylindrical portion 25b is formed projectingly and concentrically along the eccentric bore 25a, and a stay 31 is rotatably fitted on the outer periphery of the cylindrical portion 25b, the stay 31 being positioned by a circlip C. Outside the stay 31 is fixed a bracket 32 by bolts with a predetermined gap formed therebetween, and one end of the bracket 32 is connected to the body frame 2 through a link 28 as shown in FIG. 4. Further, to the bracket 32 is connected the brake caliper 27 (of a known structure) through another bracket 33. The caliper 27 is disposed so that the pads 27a thereof hold therebetween a part of the brake disc 26. Reference numeral 35 denotes a brake cable.

Adjustment of the chain 20 is performed in the following manner.

In the state of the rear axle 15 shown in FIG. 2, in which the rear axle is in its rearmost position within the pipe 21, when the rear axle 15 is to be moved forwardly for relieving the tension of the chain 20, first the bolts 24 for clamping the pipe 21 are loosened to bring the bearing holder 25 into a rotatable state within the pipe 21.

Next, by turning the holder 25 in either direction, the center 0′ of the eccentric bore 25a is moved forwardly from its present position, because the eccentric bore 25a is eccentric by ϵ from the center 0 of the pipe 21, so that the rear axle 15 concentrically inserted in the eccentric bore 25a and the driven sprocket 17 integral with the rear axle 15 also advance by the same distance. Thus, the distance between the driven sprocket 17 and the driving sprocket 19 is shortened to relieve the tension of the chain 20.

When the bolts 24 are tightened again after obtaining a predetermined tension in the foregoing manner, the bearing holder 25 is fixed firmly within the pipe 21, and the chain adjustment is then complete.

The maximum amount of adjustment is obtained when the bearing holder 25 is turned 180° in either direction from its state shown in FIG. 2, and its value is twice the eccentric amount ϵ, i.e., 2ϵ.

Because the chain adjustment is effected by turning the bearing holder 25 within the pipe 21, the adjusting operation can be performed easily and efficiently without undesirable inclination of the rear axle 15.

Furthermore, because the positional relation between the body frame 2 and the swing arm 13 is not changed by the above-described chain adjustment, it is not necessary to re-set the mounting position of a damper interposed therebetween, or its damping force.

Figure 7:
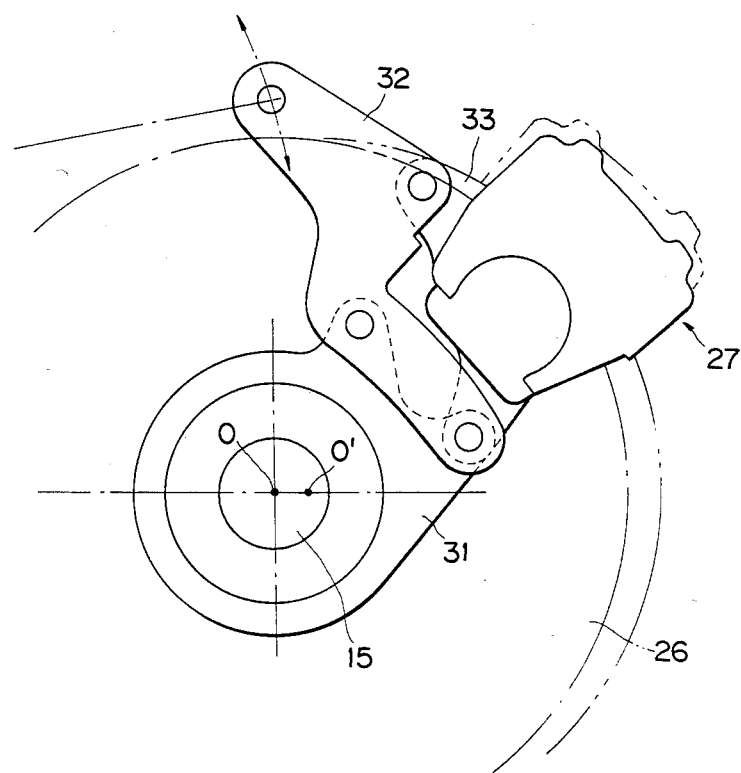
FIG. 7 is a schematic view of FIG. 6, showing a positional relation between a brake disc and a brake caliper.

In the chain adjustment described hereinabove, when the eccentric bore 25a of the bearing holder 25 and the rear axle 15 together move forwardly or rearwardly, the brake caliper 27 mounted through the stay 31 which is concentric with the eccentric bore 25a, as well as the brake disc 26 fixed to the rear axle 15, also move forwardly and rearwardly. Thus, the positional relation between the caliper 27 and the disc 26 does not change. For example, when the center 0 of the rear axle 15 is moved to 0′ during chain adjustment, as shown in FIG. 7, the caliper 27 and the disc 26 also change in position as shown by the two dotted lines in FIG. 7, but their positional relation does not change because both move concentrically with each other.

Because the caliper 27 is removably connected to the stay 31 with bolts 33 through the brackets 34 and 32, it can be attached and detached as an independent component, so that maintenance is remarkably facilitated.

Although there has been described what is at present considered to be the preferred embodiment of the invention, it will be understood that the invention may be embodied in other specific forms without departing from the spirit or essential characteristics thereof. The present embodiment is therefore to be considered in all respects as illustrative, and not restrictive. The scope of the invention is indicated by the appended claims rather than by the foregoing description.

We claim:

1. A rear axle supporting structure in a three-wheeled motor vehicle having two rear wheels and a drive chain for driving said two rear wheels, comprising:

a swing arm including a pair of right and left side members, said swing arm having the front end thereof vertically pivotably attached to a body frame of said vehicle;

a pipe member extending laterally with respect to said vehicle and fixed to the rear ends of said side members so as to interconnect the rear ends of said side members with each other;

a bearing holder member adapted to be rotatably fitted in and supported by said pipe member and having an eccentric bore which has an axis eccentric with respect to the axis of said pipe member;

said bearing holder member being provided with bearings in said eccentric bore, said bearings being spaced apart from each other laterally with respect to said vehicle;

means for clamping said bearing holder member to said pipe member;

a rear axle for said two rear wheels, said rear axle being rotatably fitted in said eccentric bore concentrically therewith through said bearings; and a driven sprocket fixed on said rear axle and operatively cooperating with said drive chain so as to be driven thereby.

2. A rear axle supporting structure according to claim 1, wherein:
   a brake disc is fixed on said rear axle; and
   a brake caliper for braking said brake disc is supported by said bearing holder member concentrically pivotably with respect to said eccentric bore of said bearing holder member.

3. A rear axle supporting structure according to claim 2, wherein:
   said brake caliper is supported by said bearing holder member through a caliper supporting member, said caliper supporting member being connected to said bearing holder member concentrically pivotably with respect to said eccentric bore of said bearing holder member.

4. A rear axle supporting structure according to claim 3, wherein:
   said caliper supporting member comprises a stay connected to said bearing holder member concentrically pivotably with respect to said eccentric bore of said bearing holder member, and at least one bracket which is connected to said stay and to which said brake caliper is connected.

5. A rear axle supporting structure according to claim 4, wherein:
   at least one said bracket is connected to said body frame of said motor vehicle through a link, said link being pivotably connected at the fore end thereof to said body frame of said motor vehicle and at the rear end thereof to said bracket.

6. A rear axle supporting structure according to claim 5, wherein:
   at least one said bracket comprises a first bracket connected to said stay and pivotably connected to said link; and
   at least one said bracket comprises a second bracket which is detachably connected to said first bracket and to which said brake caliper is connected.

7. A rear axle supporting structure in a three-wheeled motor vehicle having a drive chain for driving two rear wheels rotatably supported at the rear end of a swing arm, the front end of which is vertically pivotably attached to a body frame of the motor vehicle, comprising:
   a pipe member fixed to the rear end of said swing arm;
   a bearing holder member rotatably fitted in said pipe member and having an eccentric bore which has an axis eccentric with respect to the axis of said pipe member;
   a rear axle for said two rear wheels, said rear axle being rotatably fitted in said eccentric bore concentrically therewith;
   a driven sprocket fixed on said rear axle and operatively cooperating with said drive chain so as to be driven thereby;
   a brake disc being fixed on said rear axle;
   a brake caliper for braking said brake disc and supported by said bearing holder member concentrically pivotably with respect to said eccentric bore of said bearing holder member;
   said brake caliper being supported by said bearing holder member through a caliper supporting member, said caliper supporting member being connected to said bearing holder member concentrically pivotably with respect to said eccentric bore of said bearing holder member;
   said caliper supporting member comprising a stay connected to said bearing holder member concentrically pivotably with respect to said eccentric bore of said bearing holder member, and at least one bracket which is connected to said stay and to which said brake caliper is connected;
   at least one said bracket being connected to said body frame of said motor vehicle through a link, said link being pivotably connected at the fore end thereof to said body frame of said motor vehicle and at the rear end thereof to said bracket;
   at least one said bracket comprising a first bracket connected to said stay and pivotably connected to said link; and
   at least one said bracket comprising a second bracket which is detachably connected to said first bracket and to which said brake caliper is connected.

* * * * *